(12) United States Patent
Manolache et al.

(10) Patent No.: US 11,847,111 B2
(45) Date of Patent: Dec. 19, 2023

(54) ANOMALY DETECTION SYSTEMS AND METHODS

(71) Applicant: Bitdefender IPR Management Ltd., Nicosia (CY)

(72) Inventors: Andrei M. Manolache, Buchare (RO); Florin M. Brad, Campina (RO); Alexandru Novac, Buchare (RO); Elena Burceanu, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 53 days.

(21) Appl. No.: 17/301,641

(22) Filed: Apr. 9, 2021

(65) Prior Publication Data
US 2022/0327108 A1  Oct. 13, 2022

(51) Int. Cl.
*G06F 16/23* (2019.01)
*G06F 40/284* (2020.01)
*G06N 20/00* (2019.01)

(52) U.S. Cl.
CPC ........ *G06F 16/2365* (2019.01); *G06F 40/284* (2020.01); *G06N 20/00* (2019.01)

(58) Field of Classification Search
CPC ... G06F 16/2365; G06F 40/284; G06N 20/00; G06N 3/044; G06N 3/045; G06N 3/048; G06N 3/084; H04L 63/1416; H04L 63/1433
See application file for complete search history.

(56) References Cited

U.S. PATENT DOCUMENTS

| 5,903,884 A | * | 5/1999 | Lyon | G06F 18/28 |
| | | | | 706/20 |
| 6,742,124 B1 | | 5/2004 | Kilpatrick et al. | |
| 6,973,577 B1 | | 12/2005 | Kouznetsov | |
| 7,035,863 B2 | | 4/2006 | Kurapati et al. | |

(Continued)

FOREIGN PATENT DOCUMENTS

| EP | 3726409 A | 10/2020 | |
| EP | 3757899 A1 * | 12/2020 | ............... G06F 7/57 |

(Continued)

OTHER PUBLICATIONS

E. M. Ferragut, D. M. Darmon, C. A. Shue and S. Kelley, "Automatic construction of anomaly detectors from graphical models," 2011 IEEE Symposium on Computational Intelligence in Cyber Security (CICS), Paris, France, 2011, pp. 9-16, doi: 10.1109/CICYBS.2011.5949386. (Year: 2011).*

(Continued)

*Primary Examiner* — Dennis Truong
(74) *Attorney, Agent, or Firm* — Law Office of Andrei D Popovici, PC (57) ABSTRACT

Some embodiments employ a novel procedure of training an artificial intelligence system (e.g., set of deep neural networks) for anomaly detection in applications such as natural language processing and computer security. Token sequences selected from a training corpus are distorted according to at least one of a plurality of pre-determined sequence transformations, before being fed to a sequence analyzer. In turn, the sequence analyzer is trained to correctly guess which transformation was used to generate the respective input token sequence.

21 Claims, 6 Drawing Sheets

(56) References Cited

U.S. PATENT DOCUMENTS

| | | | |
|---|---|---|---|
| 7,089,428 | B2 | 8/2006 | Farley et al. |
| 7,234,166 | B2 | 6/2007 | Nurmela |
| 7,716,739 | B1 | 5/2010 | McCorkendale |
| 7,818,797 | B1 | 10/2010 | Fan et al. |
| 8,135,994 | B2 | 3/2012 | Keromytis et al. |
| 8,370,931 | B1 | 2/2013 | Chien et al. |
| 8,448,249 | B1 | 5/2013 | Preston |
| 8,572,239 | B2 | 10/2013 | Cao et al. |
| 8,661,034 | B2 | 2/2014 | Polonsky et al. |
| 8,719,936 | B2 | 5/2014 | Moffie et al. |
| 8,752,171 | B2 | 6/2014 | Edwards et al. |
| 8,839,435 | B1 | 9/2014 | King |
| 8,881,289 | B2 | 11/2014 | Basavapatna et al. |
| 8,887,274 | B2 | 11/2014 | Buchanan et al. |
| 8,887,286 | B2 | 11/2014 | Dupont et al. |
| 9,166,993 | B1 | 10/2015 | Liu |
| 9,652,316 | B2 | 5/2017 | Gamage et al. |
| 10,445,311 | B1* | 10/2019 | Saurabh ............... G06F 16/285 |
| 10,810,725 | B1* | 10/2020 | Dolhansky ........... G06V 10/764 |
| 2009/0328215 | A1 | 12/2009 | Arzi et al. |
| 2011/0271146 | A1* | 11/2011 | Mork ....................... G06F 21/55 |
| | | | 714/E11.029 |
| 2012/0210423 | A1* | 8/2012 | Friedrichs ........... H04L 63/1416 |
| | | | 726/22 |
| 2012/0278354 | A1 | 11/2012 | Yan et al. |
| 2014/0215618 | A1 | 7/2014 | Striem Amit |
| 2014/0230062 | A1 | 8/2014 | Kumaran |
| 2014/0283067 | A1 | 9/2014 | Call et al. |
| 2015/0082437 | A1 | 3/2015 | Dodson |
| 2015/0110357 | A1* | 4/2015 | Bala ....................... G06V 20/52 |
| | | | 382/104 |
| 2016/0149936 | A1 | 5/2016 | Pegna et al. |
| 2016/0352759 | A1 | 12/2016 | Zhai |
| 2017/0140384 | A1 | 5/2017 | Zoldi et al. |
| 2017/0171231 | A1 | 6/2017 | Reybok, Jr. et al. |
| 2018/0004961 | A1 | 1/2018 | Gil et al. |
| 2018/0032862 | A1* | 2/2018 | Oliner ................... G06F 40/274 |
| 2018/0060703 | A1* | 3/2018 | Fineis ................. G06F 18/2135 |
| 2018/0239682 | A1* | 8/2018 | Kaluza ................ G06F 11/3006 |
| 2018/0314835 | A1* | 11/2018 | Dodson ................. G06F 21/552 |
| 2019/0340615 | A1 | 11/2019 | Hanis et al. |
| 2020/0193305 | A1* | 6/2020 | Braunstein ............. G06N 5/025 |
| 2020/0285737 | A1* | 9/2020 | Kraus .................... G06F 21/552 |
| 2020/0293653 | A1* | 9/2020 | Huang ..................... G06N 3/08 |
| 2020/0296124 | A1* | 9/2020 | Pratt .................... H04L 63/1416 |
| 2021/0027302 | A1* | 1/2021 | Resheff ..................... G06N 7/01 |
| 2021/0034921 | A1* | 2/2021 | Pinkovich .............. G06N 3/082 |
| 2021/0092141 | A1* | 3/2021 | Gamble .............. H04L 63/1416 |
| 2021/0110282 | A1* | 4/2021 | McCann ............. H04L 63/1416 |
| 2021/0124876 | A1* | 4/2021 | Kryscinski ............ G06F 16/345 |
| 2021/0200612 | A1* | 7/2021 | Martyanov ............ G06F 40/279 |
| 2021/0273959 | A1* | 9/2021 | Salji ......................... G06N 7/01 |
| 2022/0284301 | A1* | 9/2022 | Qiu ........................ G06N 3/084 |
| 2022/0292074 | A1* | 9/2022 | Zhang ................... G06F 11/302 |

FOREIGN PATENT DOCUMENTS

| | | | | |
|---|---|---|---|---|
| KR | 1018111620000 | B1 | 12/2017 | |
| WO | 2020255137 | A | 12/2020 | |
| WO | WO-2020255137 | A1 * | 12/2020 | ........... G06N 3/0454 |

OTHER PUBLICATIONS

Dichiu, U.S. Appl. No. 16/215,214, filed Dec. 10, 2018.
Dichiu, U.S. Appl. No. 16/215,251, filed Dec. 10, 2018.
Dichiu, U.S. Appl. No. 16/215,179, filed Dec. 10, 2018.
Devlin et al., BERT: Pre-Training of Deep Bidirectional Transformers for Language Understanding, downloaded from https://arxiv.org/pdf/1810.04805.pdf, May 24, 2019.
Vaswani et al., "Attention Is All You Need," downloaded from https://arxiv.org/pdf/1706.03762.pdf, Dec. 6, 2017.
Wang et al., "Effective End-to-end Unsupervised Outlier Detection via Inlier Priority of Discriminative Network," 33rd Conference on Neural Information Processing Systems (NeurIPS), Vancouver, Canada, Dec. 2019.
Clark et al., "ELECTRA: Pre-Training Text Encoders as Discriminators Rather than Generators," downloaded from https://arxiv.org/pdf/2003.10555.pdf, Mar. 23, 2020.
Mukkamala et al., "Intrusion Detection Using Neural Networks and Support Vector Machines," Proceedings of the 2002 International Joint Conference on Neural Networks IJCNN'02 (Cat. No. 02CH37290), IEEE, vol. 2, pp. 1702-1707, Honolulu, HI, USA, May 12-17, 2002.
Cisco Systems, "Cisco Network-Based Intrusion Detection-Functionalities and Configuration," Chapter 8 in "Server Farm Security in the Business Ready Data Center Architecture v2.1.," Cisco Systems, Inc., San Jose, USA, Nov. 2006.
Zhong et al., "Clustering-Based Network Intrusion Detection," International Journal of Reliability, Quality and Safety Engineering, World Scientific Publishing Company, vol. 14, No. 02, pp., 169-187, Singapore, Mar. 2007.
Hossain et al., "A Framework for an Adaptive Intrusion Detection System With Data Mining," Department of Computer Science, Mississippi State University, USA, Apr. 2002.
Marin et al., "A Hybrid Approach to the Profile Creation and Intrusion Detection," Proceedings DARPA Information Survivability Conference and Exposition II, DISCEX'01; IEEE, vol. 1., pp. 69-76, Anaheim, CA, USA, Jun. 12-14, 2001.
Teng et al., "Adaptive Real-Time Anomaly Detection Using Inductively Generated Sequential Patterns," Proceedings, 1990 IEEE Computer Security Symposium on Research in Security and Privacy, IEEE, pp. 278-284, Oakland, CA, USA, May 7-9, 1990.
Lee et al., "A Data Mining Framework for Building Intrusion Detection Models," Proceedings of the 1999 IEEE Symposium on Security and Privacy (Cat. No. 99CB36344), IEEE, pp. 120-132, Oakland, CA, USA, May 14, 1999.
Lee et al., "A Framework for Constructing Features and Models for Intrusion Detection Systems," ACM Transactions on Information and Security (TISSEC), vol. 3, No. 4, pp. 227-261, New York, NY, USA, Nov. 2000.
European Patent Office (EPO), International Search Report and Written Opinion dated Sep. 8, 2022 for PCT International Application No. PCT/EP2022/058130, International Filing Date Mar. 28, 2022, Priority Date Apr. 9, 2021.

* cited by examiner

ANOMALY DETECTION SYSTEMS AND METHODS

BACKGROUND

The invention relates to artificial intelligence, and in particular to systems and methods for automatically detecting anomalies in data for natural language processing and computer security applications.

Artificial intelligence (AI) and machine learning technologies are increasingly being used to process large volumes of data, for applications such as pattern recognition, automatic classification, and anomaly detection, among others. Anomaly detection amounts to identifying specimens which deviate substantially from a standard or 'normal' collectively defined by a reference group. Anomaly detection may pose substantial technical challenges in the case of complex data, where the meaning and bounds of normality may not be clear or defined a-priori. With their capacity to automatically infer sophisticated models from data, modern artificial intelligence systems (for instance deep neural networks) have been shown to perform well on such tasks.

However, implementing machine learning to train anomaly detectors poses its own set of technical challenges. In some of the conventional approaches, training may incur extreme computational costs, may require very large training corpora, may be unstable and/or inefficient. There is therefore considerable interest in developing novel detector architectures and novel methods of training anomaly detectors for natural language processing and computer security applications.

SUMMARY

According to one aspect, a computer-implemented anomaly detection method comprises employing at least one hardware processor of a computer system, in response to selecting a training token sequence from a training corpus of token sequences and in response to selecting a transformation from a pre-determined plurality of sequence transformations, to apply the selected transformation to the training token sequence to produce a modified token sequence. The method further comprises executing a sequence analyzer having a set of adjustable parameters and configured to determine a transformation prediction indicator according to the modified token sequence, the transformation prediction indicator indicative of a likelihood that the selected transformation was applied to produce the modified token sequence. The method further comprises, in response to determining the prediction indicator, adjusting at least one parameter of the set of adjustable parameters according to the transformation prediction indicator, and in response to adjusting the at least one parameter, employing the sequence analyzer to determine whether a target token sequence is anomalous.

According to another aspect, a computer system comprises at least one hardware processor configured, in response to selecting a training token sequence from a training corpus of token sequences and in response to selecting a transformation from a pre-determined plurality of sequence transformations, to apply the selected transformation to the training token sequence to produce a modified token sequence. The at least one hardware processor is further configured to execute a sequence analyzer having a set of adjustable parameters and configured to determine a transformation prediction indicator according to the modified token sequence, the transformation prediction indicator indicative of a likelihood that the selected transformation was applied to produce the modified token sequence. The at least one hardware processor is further configured, in response to determining the prediction indicator, to adjust at least one parameter of the set of adjustable parameters according to the transformation prediction indicator, and in response to adjusting the at least one parameter, to execute the sequence analyzer to determine whether a target token sequence is anomalous.

According to another aspect, a non-transitory computer-readable medium stores instructions which, when executed by at least one hardware processor of a computer system, cause the computer system, in response to selecting a training token sequence from a training corpus of token sequences and in response to selecting a transformation from a pre-determined plurality of sequence transformations, to apply the selected transformation to the training token sequence to produce a modified token sequence. The instructions further cause the computer system to execute a sequence analyzer having a set of adjustable parameters and configured to determine a transformation prediction indicator according to the modified token sequence, the transformation prediction indicator indicative of a likelihood that the selected transformation was applied to produce the modified token sequence. The instructions further cause the computer system, in response to determining the prediction indicator, to adjust at least one parameter of the set of adjustable parameters according to the transformation prediction indicator, and in response to adjusting the at least one parameter, to execute the sequence analyzer to determine whether a target token sequence is anomalous.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
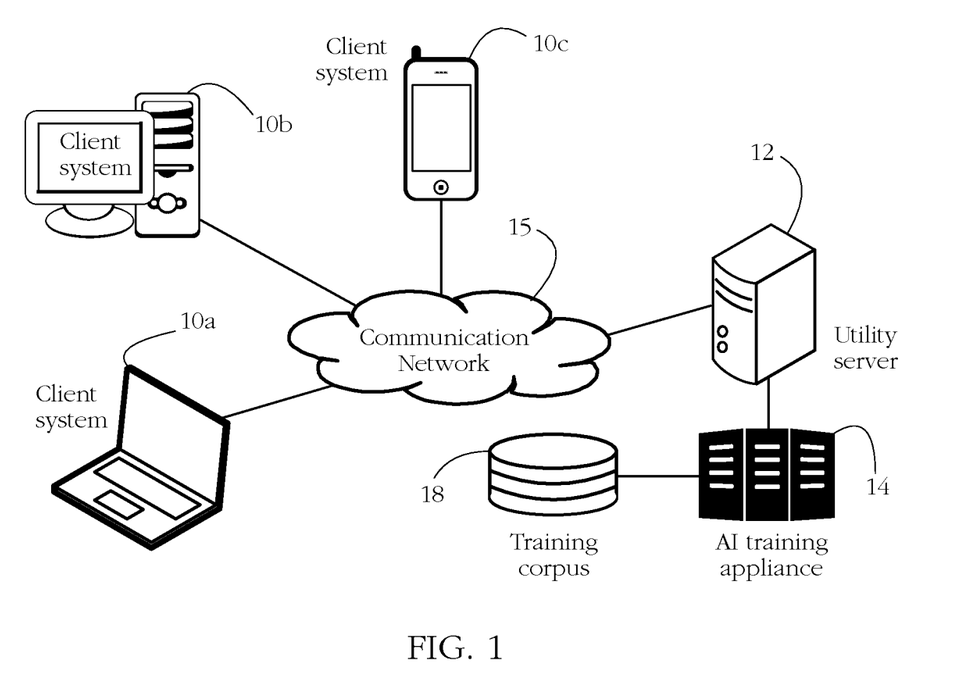
FIG. 1 shows a set of client systems collaborating with a utility server in detecting anomalies according to some embodiments of the present invention.

FIG. 1 shows an exemplary set of client systems 10a-c which may collaborate with a utility server 12 to detect anomalies in data according to some embodiments of the present invention. An anomaly is herein understood to denote an item that deviates substantially from a standard or 'normal' collectively represented by a reference collection/corpus of items. The present description will focus on detecting anomalous token sequences such as anomalous text fragments and computing event sequences. In such embodiments, an exemplary anomaly detection comprises determining that the author of a target text differs from that of a reference text. Another exemplary anomaly detection comprises determining that a sequence of computing events deviates from a normal behavior of the respective computer, possibly indicating a security breach or the presence of malicious software. Several exemplary anomaly detection use case scenarios are described below.

Client systems 10a-c generically represent any electronic appliance having a processor, a memory, and a communication interface. Exemplary client systems 10a-c include personal computers, corporate mainframe computers, servers, laptops, tablet computers, mobile telecommunication devices (e.g., smartphones), media players, TVs, game consoles, home appliances, and wearable devices (e.g., smartwatches), among others. The illustrated client systems are interconnected by a communication network 15, which may include a local area network (LAN) and/or a wide area network (WAN) such as the Internet. Server 12 generically represents a set of communicatively coupled computer systems, which may or may not be in physical proximity to each other.

Figure 2:
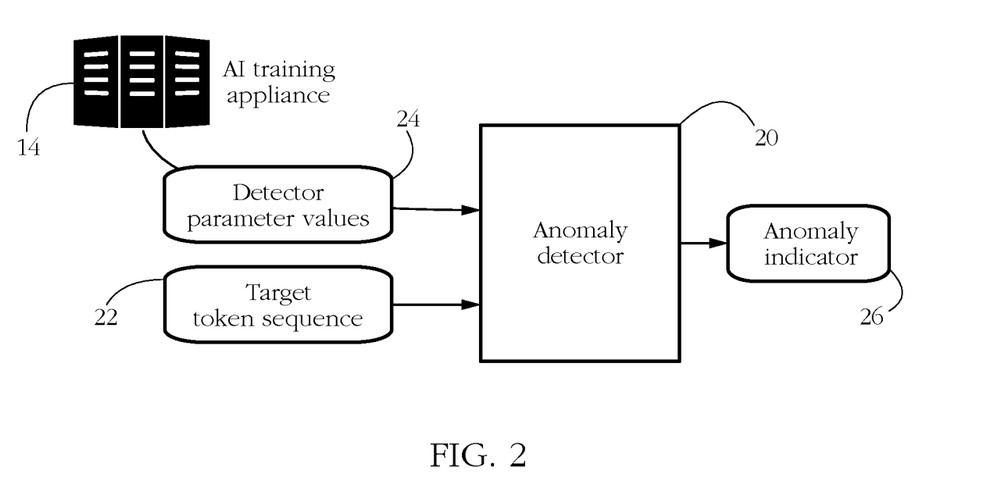
FIG. 2 illustrates an exemplary operation of an anomaly detector according to some embodiments of the present invention.

FIG. 2 illustrates the operation of an exemplary anomaly detector 20 according to some embodiments of the present invention. Anomaly detector 20 may be embodied as software, i.e., a set of computer programs comprising instructions which, when loaded in a memory and executed by a hardware processor of a computing appliance such as a personal computer or a smartphone, cause the respective appliance to carry out the respective tasks. However, a skilled artisan will understand that such embodiments are not meant to be limiting. Instead, detector 20 may be implemented in any combination of software and hardware. For instance, some or all functionality of detector 20 may be implemented in firmware and/or dedicated hardware such as a field programmable gate array (FPGA) or other application-specific integrated circuit (ASIC). The respective hardware module may be highly optimized for the respective functionality, for instance directly implement a particular version of deep neural network architecture and thus enable a substantially higher processing speed than attainable on a general-purpose processor. Furthermore, a skilled artisan will appreciate that distinct components of anomaly detector 20 and/or of a computer system configured to train detector 20 as described below may execute on distinct but communicatively coupled machines and/or on distinct hardware processors of the same computer system.

Anomaly detector 20 may be configured to receive a computer-readable encoding of a target token sequence 22 and in response, to output an anomaly indicator 26 indicative of whether the respective token sequence 22 is anomalous. An exemplary token sequence comprises an ordered array of tokens such as a fragment of text formulated in a natural language such as English and Chinese, among others. Without loss of generality, the following description will focus mainly on natural language processing examples, wherein exemplary tokens may include individual words, phrases, sentences, numbers, punctuation marks (e.g., ? ! ; : / ( ), . . . ), special characters (e.g., $ # %), abbreviations (USA, LOL, IMHO, etc.), social media handles (e.g., @POTUS), hashtags, and emoticons, among others. A skilled artisan will understand that the systems and methods described herein can be adapted to processing other types of token sequences, such as sequences of computing events and sound sequences (e.g., music, speech), among others.

An exemplary anomaly indicator 26 comprises a numerical score indicating a likelihood that the respective target token sequence is anomalous. The score may be Boolean (e.g., YES/NO) or may vary gradually between predetermined bounds (e.g., between 0 and 1). In one such example, higher values indicate a higher likelihood that the respective sequence is anomalous. An alternative anomaly indicator 26 may include a classification label indicative of a category of token sequences that sequence 22 is likely to belong to (e.g., anomalous, normal, unknown, suspect, etc.).

In one exemplary scenario, a distinct instance of anomaly detector 20 may execute on each client system 10a-c, so each client may carry out its own anomaly detection activities locally and independently. In an alternative embodiment, anomaly detector 20 may execute on utility server 12, which may thus carry out centralized anomaly detection activities on behalf of multiple client systems 10a-c. In such embodiments, server 12 may receive an encoding of target token sequence 22 from each client system 10a-c, and return a respective anomaly indicator 26 to the respective client. In one such example, clients 10a-c may access anomaly detection services via a web interface exposed by utility server 12.

Figure 3:
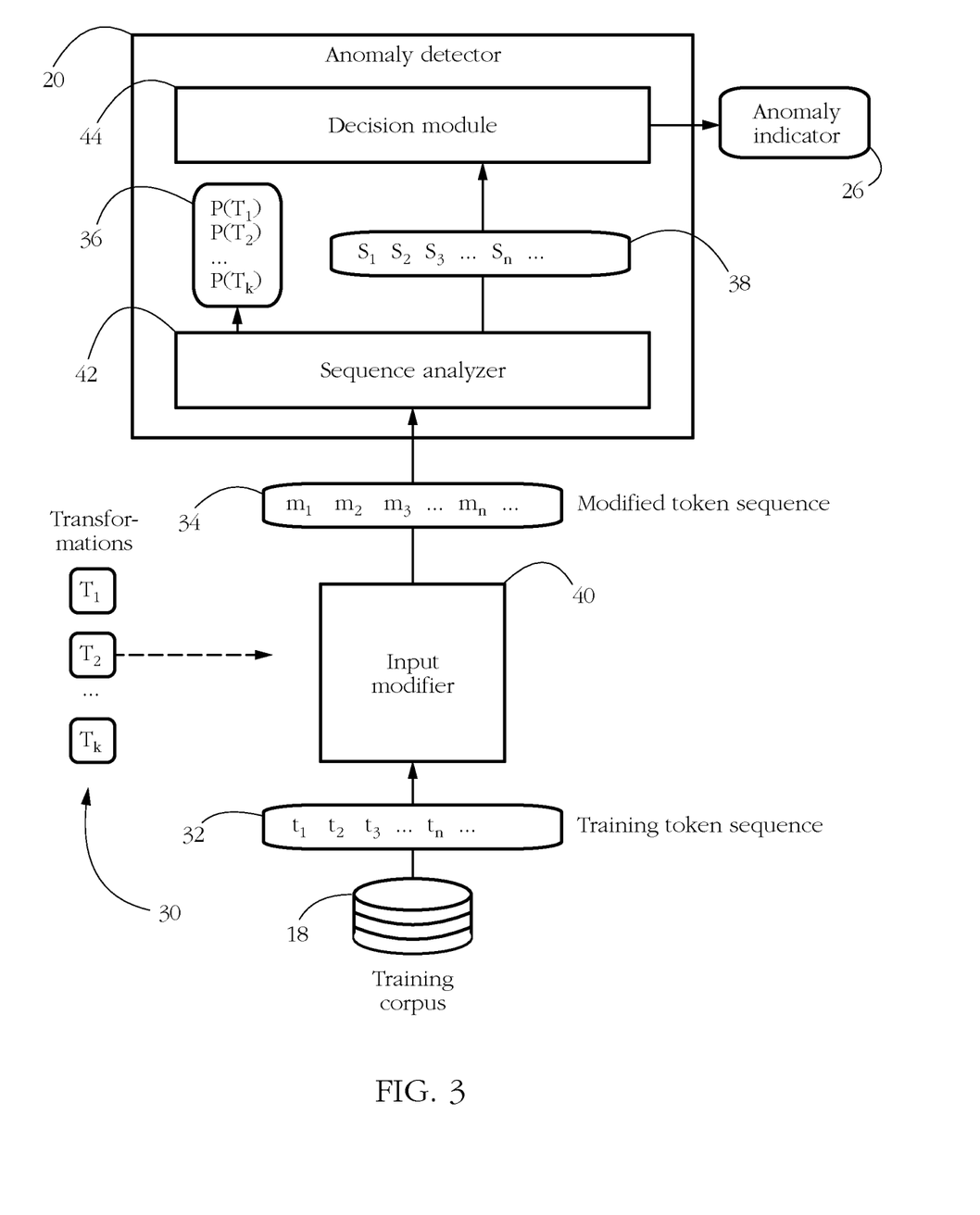
FIG. 3 illustrates an exemplary training of an anomaly detector according to some embodiments of the present invention.

FIG. 3 shows exemplary components of an anomaly detector, such as a sequence analyzer 42 connected to a decision module 44. In some embodiments, sequence analyzer 42 comprises an artificial intelligence (AI) system such as a deep neural network trained on a corpus 18 of reference token sequences. In a natural language processing scenario, corpus 18 may comprise a collection of text fragments written in a natural language (for instance, English). More specific examples of corpus 18 may consist of a collection of texts by a particular author, a collection of electronic messages (e.g., short message service—SMS messages, emails, social media posts, etc.), a collection of texts on a specific subject or area of interest (e.g., business news, sports, the Middle East, etc.), and a collection of texts written in a particular style (e.g., fiction, poetry, scientific articles, news, etc.). Individual corpus items may be tagged, labelled and/or annotated, for instance using metadata. Exemplary metadata may include an indicator of membership to a selected class/category of items (e.g., email messages sent by a specific user, financial news, etc.). Corpus 18 may be organized and stored in any format known in the art, for instance as a relational database, a simple list, or as structured data specified in an XML, or JSON format.

The contents of corpus 18 collectively define a reference or 'normal' pattern of communication, and in some embodiments anomaly detector 20 is trained to construct an inner model of the respective reference pattern, and in response, to be capable of determining whether a target text fragment fits into the learned pattern or not. When a target token sequence 22 is found not to fit the reference pattern corresponding to 'normal' text (as per corpus 18), sequence 22 may be considered an anomaly and reported as such via anomaly indicator 26.

In some embodiments, training of anomaly detector 20 is carried out by a separate, dedicated computer system, illustrated as AI training appliance 14 in FIG. 1. Appliance 14 may be communicatively coupled to utility server 12 and/or client systems 10a-c, and may comprise specialized hardware such as a graphics processing unit (GPU) farm for facilitating the computationally costly training procedures. The term 'training' is typically used in the art to denote a machine learning procedure whereby an artificial intelligence system (e.g., a neural network) is presented with a variety of training inputs and is gradually tuned according to the outputs that the respective inputs produce. For each training input/batch, training may comprise processing the respective input to produce a training output, determining a value of a problem-specific utility function according to the respective training output and/or input, and adjusting a set of parameters of the respective AI system according to the respective utility value. Adjusting the parameters may aim for maximizing (or in some cases, minimizing) the utility function. In one example of training a neural network, adjustable parameters may include a set of synapse weights, while the utility function may quantify a departure of the training output from an expected or desired output. In such an example, training may comprise adjusting synapse weights and possibly other network parameters so as to bring the training output closer to the desired output corresponding to the respective training input. Known flavors of training include supervised, unsupervised, self-supervised, and reinforcement learning, among others. In some embodiments, the number of adjustable parameters of a typical detector 20 may vary from several thousand to several million. Successful training may produce a set of optimized detector parameter values 24 (FIG. 2) which may be used to instantiate local instances of anomaly detector 20 executing on client systems 10a-c and/or utility server 12.

Training of detector 20 is schematically illustrated in FIG. 3. A skilled artisan will appreciate that not all of the illustrated components need to execute on the same hardware processor or physical machine of AI training appliance 14.

Some embodiments of the present invention distort at least some of samples contained in training corpus 18 prior to feeding them into anomaly detector 20, and then train detector 20 to identify the type of distortion that was applied. In one example as illustrated in FIG. 3, an input modifier 40 is configured to receive a training token sequence 32 selected from training corpus 18 and to output a modified token sequence 34 comprising a result of applying at least one of a predetermined set of sequence transformations 30 to training sequence 32.

Exemplary sequence transformations 30 include, among others, replacing a selected subset of tokens within sequence 32 with substitute tokens, deleting a selected subset of tokens from sequence 32, inserting a set of tokens into sequence 32, and permutating a selected subset of tokens within sequence 32. The subset of tokens targeted for modification by the respective transformation may be selected according to a position of each token within the training sequence. Targeted positions may be indicated by a binary mask, with 0s marking positions of tokens which are left unchanged, and 1 s marking positions affected by the respective transformation. For instance, a permutation transformation defined by mask [0 0 1 0 1] may transform the token sequence 'They were prepared to leave' into the modified token sequence 'They were leave to prepared', wherein the third token was swapped with the fifth.

In alternative embodiments, tokens targeted by transformations 30 may be selected according to a type of the respective tokens. For instance, some transformations may target specific parts of speech (e.g., nouns, verbs, adjectives) or tokens having specific grammatical roles (e.g., the subject of a sentence). One such exemplary transformation may replace a verb with a substitute verb or verb phrase. The respective substitute token or token sequence may be selected to be a synonym or an antonym of the target token/sequence. More sophisticated examples of sequence transformations 30 may include paraphrasing, i.e., replacing entire token sequences with substitute sequences while preserving meaning. One example of a paraphrasing transformation comprises replacing the training sequence 'Kids by the lake were being eaten alive by mosquitoes' with the modified sequence 'Mosquitoes ferociously attacked the kids by the lake'.

Similar transformations may be applied in a computer security embodiment wherein each token of sequence 32 comprises an individual computing event. For instance, an exemplary transformation 30 may remove tokens of type 'create process' from training sequence 32. An equivalent of paraphrasing in such embodiments may comprise replacing a target sequence of events with a substitute sequence of events that would bring the respective computer system to the same final state.

Figure 4:
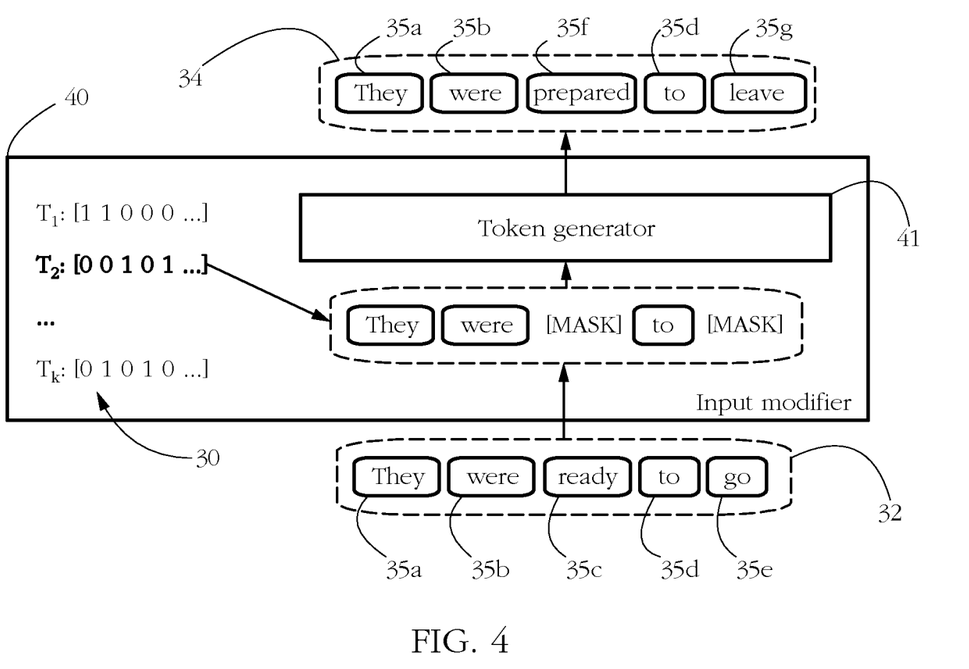
FIG. 4 shows an exemplary operation of an input modifier according to some embodiments of the present invention.

FIG. 4 illustrates an exemplary operation of input modifier 40 implementing a plurality of pre-defined sequence transformations 30 according to some embodiments of the present invention. A training sequence 32 comprises tokens

35*a-e*, which are individual words in the current example. In the illustrated embodiment, each transformation 30 comprises replacing a set of tokens from training sequence 32 with substitute tokens. Each transformation 30 may be defined by a distinct binary mask as shown, indicating a distinct set of positions within training sequence 32 which are targeted for token replacement. In the illustrated example, applying the $T_2$ mask to sequence 32 masks the third and fifth tokens of sequence 32, effectively marking said tokens for replacement.

In some embodiments, input modifier 40 further comprises a token generator 41 configured to output a set of substitute tokens to replace the masked tokens within sequence 32. In the illustrated example, token generator outputs substitute tokens 35*f* and 35*g* to replace tokens 35*c* and 35*e*, respectively. A simple embodiment of generator 41 may be configured to randomly draw the substitute token from a reference pool. In more advanced embodiments, token generator 41 may comprise a dictionary/thesaurus and be configured, for each masked token, to output a synonym or an antonym of the respective token. In other exemplary embodiment, generator 41 may determine a substitute token according to the masked token and further according to a context of the masked token, the context consisting of a fragment of sequence 32 preceding the masked token and/or a fragment of sequence 32 following the masked token. For instance, in the example of FIG. 4, a context of token 35*c* ('ready') may comprise tokens 35*b* and 35*d* ('were to'). Such embodiments may employ statistical language models to generate a substitute token according to a probability of occurrence of the respective substitute token within the context of the masked token. In other words, token generator 41 may be configured to produce a plausible substitute token given the context of the respective token sequence.

One exemplary embodiment of token generator 41 producing plausible substitute tokens comprises an AI system (e.g., set of deep neural networks) trained on a corpus of token sequences representative for the respective anomaly detection application. Such a version of generator 41 may output a substitute token according to a subsequence of tokens preceding a masked token within sequence 32. In the illustrated example, trained generator 41 is capable of producing substitute token 35*g* ('leave') as having a high likelihood of following the sequence of tokens 35*a-d* ('they were ready to'). One example of such AI-based token generator 41 implements a Bidirectional Encoder Representation From Transformers (BERT) model of language, for instance as described in J. Devlin et al. 'BERT: Pre-training of Deep Bidirectional Transformers for Language Understanding', arXiv:1810.04805. In some embodiments, token generator 41 is co-trained with sequence analyzer 42 in the sense that during training, token generator 41 is connected to sequence analyzer 42 as illustrated in FIGS. 3-4, generator 41 has a set of adjustable functional parameters (e.g., synapse weights etc.) distinct from adjustable parameters of sequence analyzer 42, and at least one adjustable parameter of trained generator 41 is tuned according to an output of sequence analyzer 42.

Figure 5:
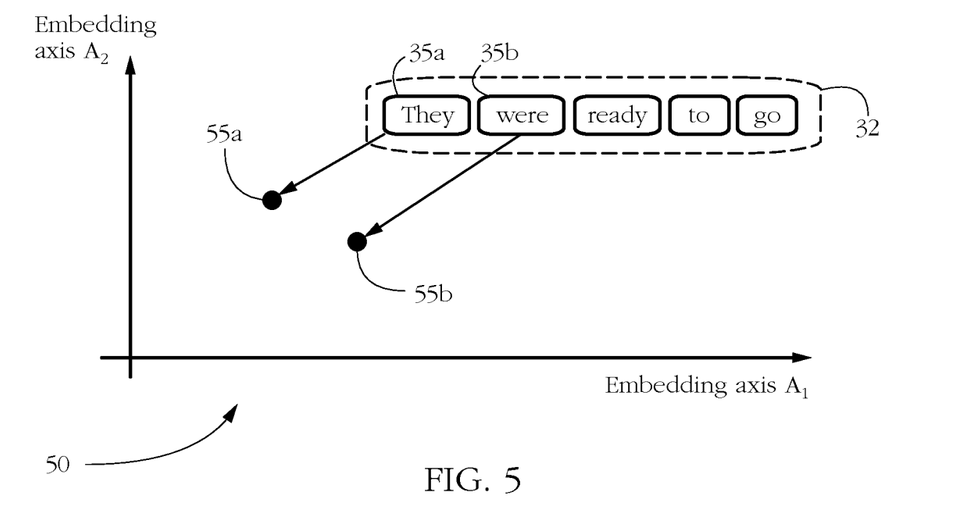
FIG. 5 illustrates an exemplary token embedding space according to some embodiments of the present invention.

Other exemplary sequence transformations 30 implemented by input modifier 40 may comprise manipulations of token embedding vectors. In such embodiments, modified sequence 34 may comprise an array of embedding vectors instead of a sequence of tokens per se. Input modifier 40 may include a token encoder configured to determine a set of coordinates indicating a position of each token of training sequence 32 in an abstract multidimensional vector space commonly known in the art as an embedding space. The respective set of coordinates collectively define a token embedding vector associated with the respective token. FIG. 5 shows an exemplary token embedding space 50 and a set of token embedding vectors 55*a-b* representing tokens 35*a-b*, respectively.

An exemplary embedding space is spanned by a set of axes, wherein each axis represents a distinct token feature or a linear combination of token features (for instance, in a principal component/singular value decomposition embodiment). In embodiments configured to detect anomalies in sequences of computing events, token features may comprise various event features of each event (e.g., a type of event, a path indicator, a network address, etc.). In preferred embodiments, tokens are embedded according to their position within a training sequence, or stated otherwise, according to their context. In such cases, embedding space 50 may comprise an abstract context space, wherein two tokens that occur predominantly in similar contexts are located relatively close together. Several such embeddings are known in the art, including word2vec, GloVe, and BERT, among others. To generate embedding vector representations 55*a-b*, the token encoder must be trained on a corpus of token sequences, which may coincide with training corpus 18, i.e., with the corpus used for training sequence analyzer 42. Training may proceed according to any method known in the art, for instance according to a bag-of-words and/or skip-gram algorithm. In some embodiments, the token encoder is co-trained with analyzer 42, in the sense that adjustable parameters of the token encoder are tuned according to an output of sequence analyzer 42.

Figure 6:
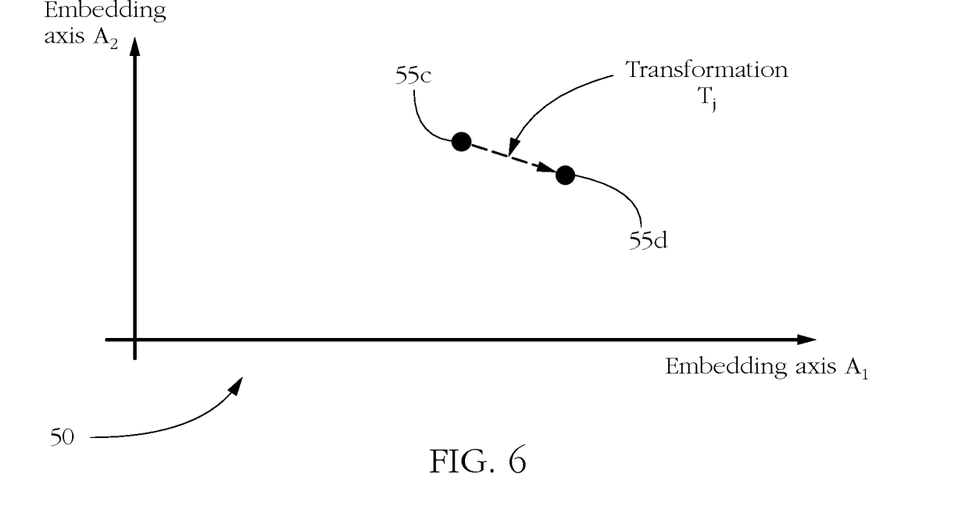
FIG. 6 shows an exemplary sequence transformation according to some embodiments, the illustrated transformation comprising nudging a representative vector of a selected token.

Some sequence transformations 30 (FIG. 3) for distorting training sequence 32 may operate directly on embedding vectors, as illustrated in FIG. 6. An exemplary transformation $T_j$ may change an original token embedding vector 55*c* representing a selected token of training sequence 32 into a modified vector 55*d*. Exemplary embedding transformations include nudging a vector by a small amount ε along one of the axes or along a transformation-specific predetermined direction. Other exemplary transformations may comprise a rotation and a reflection about a pre-determined plane. The respective transformation may apply to all tokens of training sequence 32 or only to selected tokens identified for instance by a binary mask (as shown above) or by other selection criteria.

In some embodiments, sequence analyzer 42 is configured to process an input token sequence to produce a set of prediction indicators including a transformation prediction indicator 36 and a token prediction indicator 38 determined according to the input token sequence. Transformation prediction indicator 36 is indicative of which sequence transformation 30 was likely used to produce the input token sequence. In an exemplary embodiment, transformation prediction indicator 36 comprises a plurality of numerical scores $P(T_1), P(T_2), \ldots P(T_k)$, each score $P(T)$ indicative of a likelihood that a respective transformation $T_j$ was applied to produce the respective input token sequence. For instance, indicator 36 may include a distinct score for each distinct sequence transformation 30 implemented by input modifier 40. Scores $P(T_j)$ may be scaled between predetermined bounds (e.g., between 0 and 1), with higher values indicating a higher likelihood.

In turn, some embodiments of token prediction indicator 38 indicate which tokens of the input sequence are likely to have been modified by input modifier 40. In an exemplary embodiment, token prediction indicator 38 comprises a plurality of numerical scores $S_1, S_2, \ldots$, wherein a score $S_n$ indicates a likelihood that the n-th token of the input sequence was changed by input modifier 40. In a training process as illustrated in FIG. 3, each score $S_n$ may indicate a likelihood that the n-th token of modified token sequence 34 differs from the n-th token of the respective training sequence 32.

From an intuitive viewpoint, transformation prediction indicator 36 represents an attempt to guess which transformation was used to distort training sequence 32, while token prediction indicator 38 represents an attempt to guess which individual tokens were corrupted. Although indicators 36 and 38 seem to convey redundant information (after all, each transformation has a specific token mask), indicators 36 and 38 are independent in the sense that they are generated by distinct subsystems of sequence analyzer 42 (e.g., distinct groups of neurons of a deep neural network). Furthermore, there is no a priori knowledge built into sequence analyzer 42 of a connection or correlation between sequence transformations 30 and their associated token masks. Instead, analyzer 42 may learn such correlations automatically during training. Some embodiments rely on the observation that using both indicators 36 and 38 may substantially facilitate training of sequence analyzer 42, for instance accelerating learning or allowing the use of a substantially smaller training corpus to achieve a similar anomaly detection performance as using only one of indicators 36 and 38.

Figure 7:
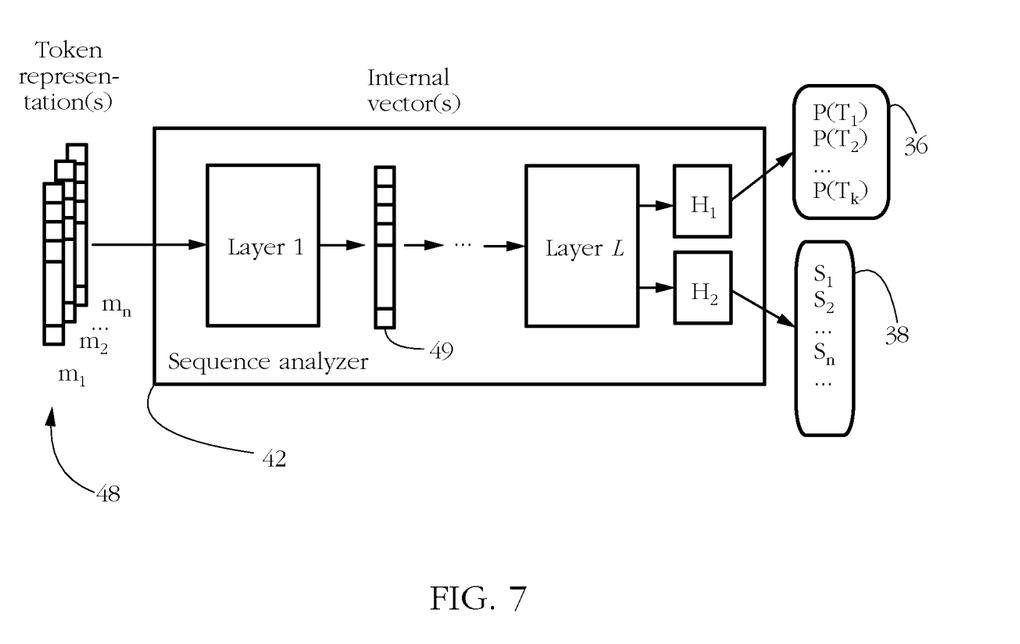
FIG. 7 shows an exemplary structure of a sequence classifier according to some embodiments of the present invention.

An exemplary architecture of sequence analyzer 32 is illustrated in FIG. 7 and comprises a stack of layers/neural network modules, each layer receiving the output of the previous layer/module and providing input to the next layer of the stack. Sequence analyzer 32 may receive input in the form of an array of token representations 48, each token representation comprising a vector of numbers characterizing a respective token of the input sequence. In a training scenario, each token representation 48 in FIG. 7 may represent a distinct token of modified sequence 34 (FIG. 3). In one exemplary embodiment using what is known in the art as a 1-hot encoding, token representation 48 comprises a N×1 vector wherein each row represents a distinct token type, N represents a size of a token vocabulary, and a non-zero element indicates that the respective token is of the respective token type. An exemplary size N of the token vocabulary ranges from several hundred to several million for specific applications. In another example, each token representation 48 may comprise a token embedding vector generated according to any embedding algorithm known in the art. See e.g., embedding vectors 55a-b in FIG. 5 discussed above.

Each consecutive layer $L_i$ transforms the input received from the previous layer according to a set of parameters (e.g., activations, weights, biases) specific to the respective layer, to produce an internal vector 49, the size and range of values of which may vary among the distinct layers/modules of analyzer 32. For instance, some layers achieve a dimensionality reduction of the respective input vector, as in the case of a pooling or loss layer. The type and architecture of each layer may differ across embodiments.

One exemplary architecture of sequence analyzer 42 comprises a convolutional neural network (CNN) layer followed by a dense (i.e., fully connected) layer further coupled to a rectifier (e.g., ReLU or other activation function) and/or a loss layer. Alternative embodiments may comprise a CNN layer feeding into a recurrent neural network (RNN), followed by fully connected and ReLU/loss layers. Convolutional layers effectively multiply internal vector 49 with a matrix of weights known in the art as filters, to produce an embedding tensor so that each element of the respective tensor has contributions from a selected token, but also from other tokens adjacent to the selected token. The embedding tensor therefore collectively represents the input token sequence at a granularity that is coarser than that of individual tokens. The filter weights are adjustable parameters which may be tuned during the training process.

Recurrent neural networks (RNN) form a special class of artificial neural networks, wherein connections between the network nodes form a directed graph. Several flavors of RNN are known in the art, including long-short-term-memory (LSTM) networks and graph neural networks (GNN), among others. A typical RNN comprises a set of hidden units (e.g., individual neurons), and the topology of the network is specifically configured so that each hidden unit receives an input (e.g., embedding vector) characterizing a respective token $m_j$, but also an input provided by an adjacent hidden unit, which in turn receives an input characterizing a token $m_{j-1}$ preceding token $m_j$ within the input token sequence. As a result, the output of each hidden unit is influenced not only by the respective token $m_j$, but also by the preceding token $m_{j-1}$. Stated otherwise, an RNN layer may process information about each token in the context of previous token(s). Bi-directional RNN architectures may process information about each token in the context of both previous and subsequent token(s) of the input token sequence.

Yet another exemplary embodiment of sequence analyzer 42 may comprise a stack of transformer neural network layers. The transformer architecture is described, for instance, in A. Vaswani et al., 'Attention is all you need', arXiv:1706.03762, among others. For each input token sequence, transformer layers may produce a sequence of contextualized token embedding vectors, wherein each token embedding vector $h_j$ encodes information from multiple (e.g., all) tokens $m_j$ of the input sequence. The output of the transformer layers may be fed into multiple distinct classifier modules (e.g., dense layers) known in the art as prediction heads and illustrated as blocks $H_1$ and $H_2$ in FIG. 7. Heads $H_1$ and $H_2$ may then output transformation prediction indicator 36 and token prediction indicator(s) 38, respectively.

Figure 8:
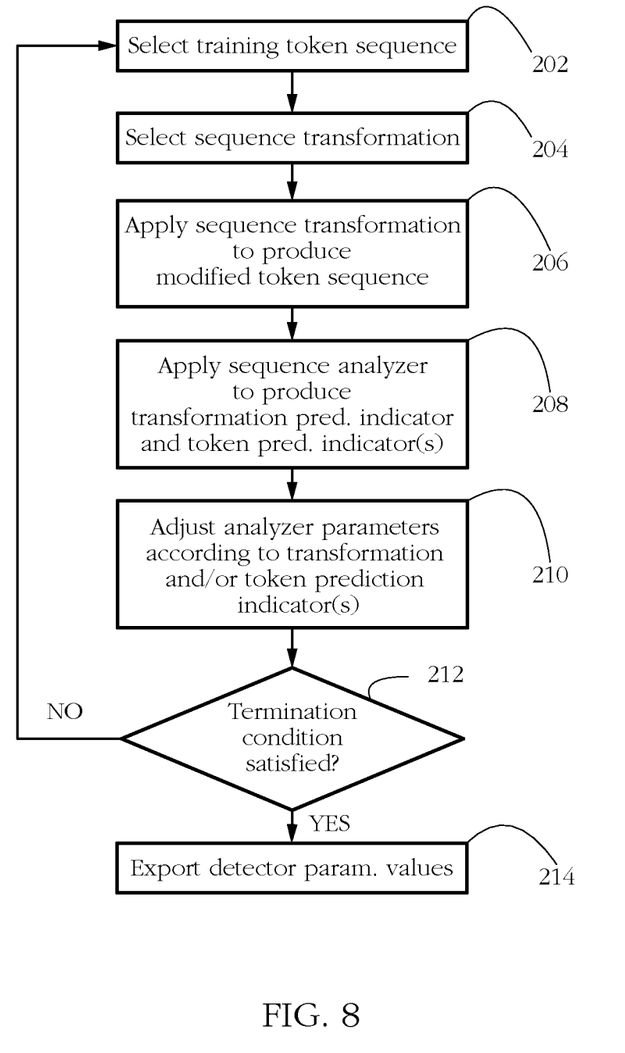
FIG. 8 shows an exemplary sequence of steps performed during training of an anomaly detector according to some embodiments of the present invention.

FIG. 8 shows an exemplary sequence of steps carried out by AI training appliance 14 (FIG. 1) to train anomaly detector 20 according to some embodiments of the present invention. In response to selecting training sequence 32 from corpus 18, a sequence of steps 204-206 may (e.g., randomly) select a transformation from the available set of sequence transformations 30 and apply the respective transformation to training sequence 32 thus generating modified token sequence 34.

Modified sequence 34 is fed to sequence analyzer 42, which processes it to produce prediction indicators 36 and/or 38. A step 208 may then determine a utility function according to training sequence 32 and/or prediction indicators 36 and/or 38. An exemplary utility function, also known as loss in the art of machine learning, may be expressed as:

$$\Sigma_x U(\theta, x), \quad [1]$$

wherein x denotes a training sequence and θ denotes the set of adjustable parameters. Training may comprise adjusting parameters θ in the direction of minimizing utility U.

A simple utility function may quantify a departure of the output of analyzer 42 from a desired output. For instance, an exemplary utility function may indicate whether analyzer 42 has correctly guessed which transformation was applied in step 206 and/or which tokens of the original training sequence 32 were corrupted in step 206, and may penalize analyzer 42 for wrong guesses.

Some embodiments rely on the observation that combining utilities determined according to indicators 36 and 38 may facilitate training and/or lead to a more performant sequence analyzer 42. A preferred embodiment may use an aggregate utility function combining a sequence-level component (indicative of a choice of sequence transformation) with a token-level component (indicative of whether each individual token was corrupted or not):

$$U = \lambda_1 U_S + \lambda_2 U_T, \qquad [2]$$

wherein $U_S$ and $U_T$ denote the sequence-level component and token-level component, respectively, and wherein $\lambda_1$ and $\lambda_2$ are weights allowing to change the relative contributions of each utility function. In some embodiments implementing a maximum likelihood training strategy, $$U_S = E_{k,x}[-\log P(T_k|\tilde{x}, \theta_A)], \qquad [3]$$

wherein E denotes expectation and $P(T_k|\tilde{x}, \theta_A)$ denotes a probability that distorted sequence was produced by application of sequence transformation $T_k$ (see e.g., transformation prediction indicator 36 in FIG. 3), and wherein $\theta_A$ generically denotes adjustable parameters of sequence analyzer 42. Meanwhile, $$U_T = E_{k,x}[\Sigma_i - \log S_i(T_k|\tilde{x}, \theta_A)], \qquad [4]$$

wherein $S_i(T_k|\tilde{x}, \theta_A)$ denotes the probability that token i of training sequence x was affected by the application of sequence transformation $T_k$ (see e.g., token prediction indicator 38 in FIG. 3).

In some embodiments, a component of input modifier 40 (such as token generator 41 and/or a token encoder configured to generate token embedding vectors) is co-trained with sequence analyzer 42. Such embodiments may use a generator utility function in addition to $U_S$ and $U_T$ described above:

$$U = \lambda_1 U_S + \lambda_2 U_T + \lambda_3 U_G, \qquad [5]$$

wherein $\lambda_3$ denotes another weight used to adjust the contribution of the generator utility function $U_G$ to the global utility, and wherein:

$$U_G = E_{k,x}[\Sigma_i - \log P_G(t_i|\tilde{x}, \theta_G)], \qquad [6]$$

wherein $\theta_G$ generically denotes adjustable parameters of token generator 41 and $P_G(t_i|\tilde{x}, \theta_G)$ denotes a probability that token $t_i$ appears in modified sequence 34, or stated otherwise, a probability that token $t_i$ is plausible in the context of modified sequence 34.

A further step 210 may then adjust a set of parameters $\theta_A$ and/or $\theta_G$ according to the determined utility function. Such adjustments may implement a backpropagation procedure by gradient descent, or any other maximum likelihood search aimed at minimizing the chosen utility function. Training may continue until a termination condition is satisfied (step 212), for instance, for a pre-determined number of epochs, until a pre-determined number of training sequences were analyzed, until a pre-determined level of anomaly-detection performance was demonstrated, etc. In response to a successful training, optimal values of adjustable parameters (e.g., synapse weights, etc.) of sequence analyzer 42 may be exported and transmitted to client systems 10a-c in the form of detector parameter values 24 (FIG. 2).

Figure 9:
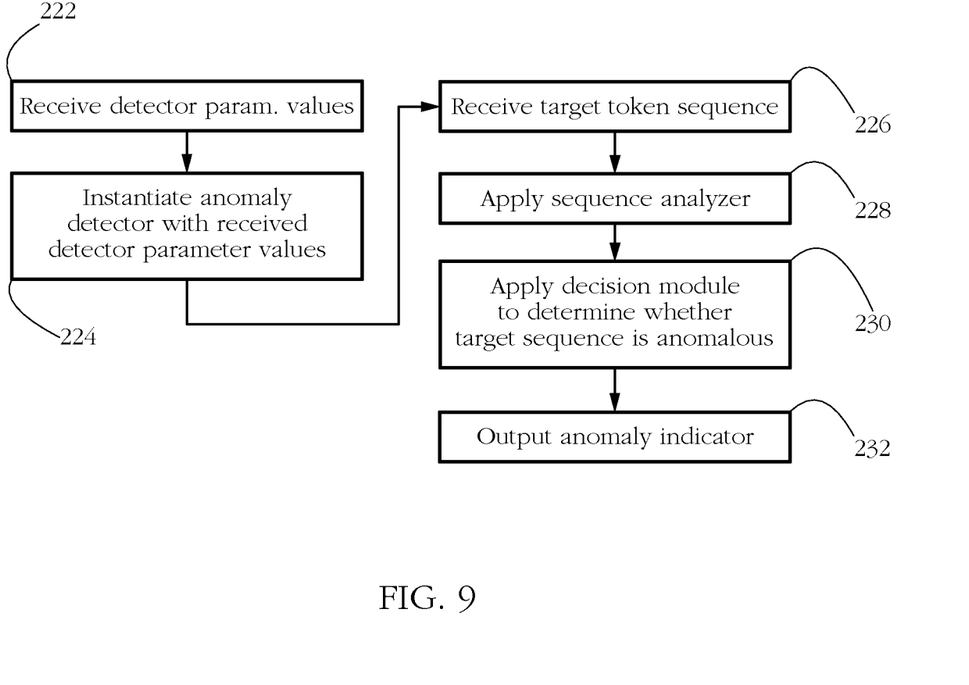
FIG. 9 illustrates an exemplary sequence of steps performed by the trained anomaly detector according to some embodiments of the present invention.

FIG. 9 illustrates an exemplary sequence of steps performed by client systems 10a-c and/or utility server 12 to detect anomalies according to some embodiments of the present invention. A sequence of steps 222-224 prepares detector 20 for operation by receiving detector parameter values 24 from AI training appliance 14 (FIG. 2) and instantiating a local instance of detector 20 with the respective values. Then, for each target token sequence 22, a step 228 may execute sequence analyzer 42 to determine token prediction indicator 38 for the respective target token sequence 22.

A further step 230 may apply decision module 44 to produce anomaly indicator 26. In some embodiments, decision module 44 is configured to determine anomaly indicator 26 according to token prediction indicator 38, for instance as an average of individual token prediction scores $S_i$ taken over the entire target token sequence 22. Each individual score $S_i$ may quantify a likelihood of whether the respective token of sequence 22 was corrupted by application of a sequence transformation 30, as described above in relation to FIG. 3. Some embodiments may determine a sequence-specific anomaly score A according to:

$$A = \frac{1}{L_s} \sum_i S_i, \qquad [7]$$

wherein $L_s$ denotes the length (count of tokens) of target sequence 22. In an embodiment wherein large $S_i$ values indicate a high likelihood that the respective token was corrupted, a large value of A may indicate a high likelihood that target token sequence 22 is anomalous. Conversely, when large $S_i$ values indicate that the respective token is likely not to be corrupted, a large A value may indicate that target sequence 22 is not an anomaly. Some embodiments of decision module 44 may compare the calculated value of the anomaly score A to a pre-determined threshold and determine whether target token sequence 22 is anomalous or not according to a result of the comparison.

Figure 10:
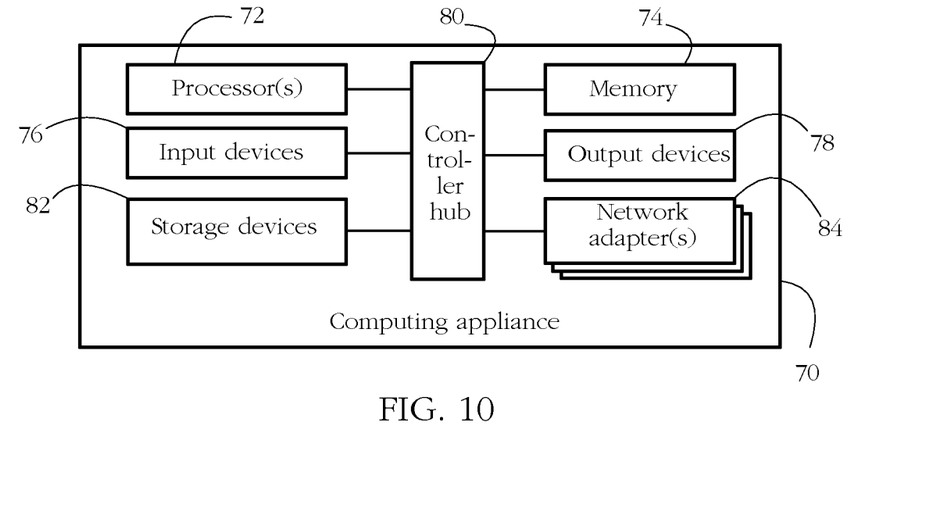
FIG. 10 shows an exemplary computing appliance configured to carry out some of the methods described herein.

FIG. 10 shows an exemplary hardware configuration of a computing appliance 70 programmed to execute some of the methods described herein. Computing appliance 70 may represent any of client systems 10a-c, utility server 12, and AI training appliance 14 in FIG. 1. The illustrated computing appliance is a personal computer; other devices such as servers, mobile telephones, tablet computers, and wearables may have slightly different configurations. Processor(s) 72 comprise a physical device (e.g. microprocessor, multi-core integrated circuit formed on a semiconductor substrate) configured to execute computational and/or logical operations with a set of signals and/or data. Such signals or data may be encoded and delivered to processor(s) 72 in the form of processor instructions, e.g., machine code.

Processors 72 are generally characterized by an instruction set architecture (ISA), which specifies the respective set of processor instructions (e.g., the x86 family vs. ARM® family), and the size of registers (e.g., 32 bit vs. 64 bit processors), among others. The architecture of processors 72 may further vary according to their intended primary use. While central processing units (CPU) are general-purpose processors, graphics processing units (GPU) may be optimized for image/video processing and some forms of parallel computing. Processors 72 may further include application-specific integrated circuits (ASIC), such as Tensor Processing Units (TPU) from Google®, Inc., and Neural Processing Units (NPU) from various manufacturers. TPUs and NPUs may be particularly suited for machine learning applications as described herein.

Memory unit 74 may comprise volatile computer-readable media (e.g. dynamic random-access memory—DRAM) storing data/signals/instruction encodings accessed or generated by processor(s) 72 in the course of carrying out operations. Input devices 76 may include computer keyboards, mice, and microphones, among others, including the respective hardware interfaces and/or adapters allowing a user to introduce data and/or instructions into appliance 70. Output devices 78 may include display devices such as monitors and speakers among others, as well as hardware interfaces/adapters such as graphic cards, enabling the respective computing appliance to communicate data to a user. In some embodiments, input and output devices 76-78 share a common piece of hardware (e.g., a touch screen). Storage devices 82 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 84 enable computing appliance 70 to connect to an electronic communication network (e.g, network 15 in FIG. 1) and/or to other devices/computer systems.

Controller hub 80 generically represents the plurality of system, peripheral, and/or chipset buses, and/or all other circuitry enabling the communication between processor(s) 72 and the rest of the hardware components of appliance 70. For instance, controller hub 80 may comprise a memory controller, an input/output (I/O) controller, and an interrupt controller. Depending on hardware manufacturer, some such controllers may be incorporated into a single integrated circuit, and/or may be integrated with processor(s) 72. In another example, controller hub 80 may comprise a northbridge connecting processor 72 to memory 74, and/or a southbridge connecting processor 72 to devices 76, 78, 82, and 84.

The exemplary systems and methods described above allow an efficient automatic detection of anomalies in various applications. In some embodiments, token sequences drawn from a training corpus are distorted according to at least one of a plurality of pre-determined sequence transformations, before being fed to a sequence analyzer undergoing training. The sequence analyzer is then trained to correctly guess which transformation was used to generate the respective input token sequence.

Some conventional procedures for training an anomaly detector corrupt a training token sequence by randomly replacing some of the tokens, and subsequently train the detector to guess which tokens were replaced. However, such training strategies are relatively costly in terms of computational resources, and may be unstable for some choices of training corpus and/or applications. In contrast to this conventional approach, some embodiments of the present invention use a pre-defined set of transformations to distort input token sequences, and train according to an aggregate utility function that combines a token-level component (indicative of whether each individual token was corrupted or not) with a sequence-level component (indicative of a manner of distorting the whole input sequence). Using a sequence-level utility in addition to a more conventional token-level utility may seem counter-intuitive since in some embodiments each sequence transformation has a specific token mask and therefore guessing which transformation was applied may effectively amount to also guessing which tokens were corrupted. However, some embodiments rely on the observation that setting up a sequence-level learning task (guessing the transformation that was applied) concurrently with a token-level task (guessing whether a particular token was corrupted) may reinforce correct learning, for instance by discouraging the sequence analyzer from predicting nonexistent mask patterns. In some embodiments, token-level predictions and sequence-level predictions are produced by distinct prediction heads of a deep neural network. There is therefore no a priori knowledge of a correlation between transformations and token masks built into the anomaly detector. Instead, the detector learns such potential correlations during training, which may lead to more robust models.

Computer experiments have shown that combining token-level and sequence-level tasks facilitates learning by improving the performance of the detector. Conversely, the same level of anomaly detection performance may be achieved using smaller training corpora and/or fewer network parameters by using a training strategy as described herein. This may be particularly advantageous for anomaly detection tasks such as authorship attribution in situations wherein training corpus 18 has a relatively small size (for instance when the training corpus consists of social media posts). Training the detector as described herein intuitively corresponds to artificially increasing the size of the training corpus, since the same training token sequence 32 may give rise to multiple distinct modified sequences 34 in response to application of distinct sequence transformations 30 (see FIG. 3).

Some embodiments employ a second AI system to produce plausible distortions of the training sequences. For instance, a token generator implementing a BERT language model may be used to substitute selected tokens with plausible replacements given the context of the rest of the respective token sequence. Some embodiments explicitly co-train the token generator together with the anomaly detector instead of using a pre-trained, high-performance version of the token generator, relying on the observation that an already trained generator may hinder learning by producing modified training sequences which are in a sense 'too plausible' to be considered anomalies. Co-training may ensure that the token generator becomes increasingly more proficient at generating plausible modified training sequences as the sequence analyzer becomes more proficient at detecting modifications. Furthermore, pre-training the token generator on a corpus distinct from the corpus used for training the anomaly detector may bring in outlier information and prevent the anomaly detector from recognizing it as such.

Anomaly detectors trained according to some embodiments of the present invention may be used in a variety of scenarios, including, among others:
Automatic Text Classification In an exemplary natural language processing (NLP) application, anomaly detector 20 may be trained on a corpus consisting of text belonging from a specific category (e.g., business news) and then used to determine whether a target text fragment belongs to the respective category or not. In such embodiments, a high anomaly score may indicate that the respective text does not belong to the respective category.

In a computer experiment, an anomaly detector as described herein was trained on a subset of a standard reference corpus of news articles (20Newsgroups), the subset consisting of articles from a selected category (computing, recreation, scientific, miscellaneous, politics, or religion). The experiment used a sequence analyzer comprising four stacked transformer layers with two prediction heads on top. Each transformer layer comprised four self-attention heads, hidden layer of size 256, and feed-forward layers of sizes 1024 and 256. Each prediction head had 2 linear layers separated by a non-linearity, and ending with a classification layer. The maximum size of training token sequences was 128. Sequence transformations 30 consisted of replacing tokens according to distinct mask patterns, using a random token generator. Mask patterns of various count and coverage were tried, with between 5 to 100 distinct mask patterns, covering between 25% and 50% of the input training sequence.

The trained detector was then asked to identify whether a randomly selected article from the collection belongs to the category that the detector was trained on. The anomaly detector trained according to some embodiments of the present invention consistently and substantially outperformed state-of-the-art conventional anomaly detectors at the respective task, with typical area under the receiver operating curve (AUROC) values ranging from approximately 70% (when trained on the science category) to over 92% (when trained on computing news). The experiment revealed that in general, increasing the number of distinct transformations improves the performance of the trained anomaly detector up to a point, encouraging expressiveness in the token embeddings. Transformations having a percentage of 25% to 50% of corrupted tokens seemed to produce the best results.

Automatic Authorship Attribution

Some embodiments of anomaly detector 20 may be trained on a corpus of text (e.g., letters, articles, blog posts, emails, social media posts) written by a selected author, and then used to determine whether a target text fragment was authored by the respective person. Exemplary applications comprise determining the author of an anonymous letter, verifying the authenticity of various documents, and posthumous attribution of a literary piece. Some embodiments may also have forensic applications. For instance, law enforcement may be interested in identifying the author or user of a Dark Web resource, e.g., identifying the author of a message posted on a forum acting as a meeting point for users engaging in criminal activity such as trade in stolen goods, credit card data, child pornography, guns, drugs, etc. The term 'Dark Web' is herein used to denote content which is not indexed by search engines and/or is only accessible via private peer-to-peer networks or anonymizing software such as Tor.

An exemplary embodiment of an anomaly detector trained on a corpus of online content authored by a set of suspects and publicly available (e.g., comments posted by the respective suspects on popular social media sites and/or user forums) may then be used to analyze a target text fragment harvested from the Dark Web. An anomaly score indicating that the target text is not anomalous may indicate that the author of the target text coincides with one of the authors of the corpus of text that the detector was trained on.

Social Media Monitoring

An embodiment of anomaly detector 20 may be trained on web content associated with a selected set of social media accounts, for instance on a particular collection of Twitter® feeds. The training corpus may be further limited to content published within a specific time window (e.g. a day, a week, etc.). The detector may then be used to analyze newly posted content. An anomaly may indicate a change in topic and/or a change in the tone of an ongoing exchange, thus allowing a timely automatic detection of new topics and trends.

Detection of Fakes and Autogenerated Content

An embodiment of anomaly detector 20 may be trained on a corpus of text written by selected human authors (e.g., actual news articles, social media posts by actual users). The corpus may be further narrowed to articles written for a selected journal, newspaper, or news website, or to articles written by selected journalists. The trained anomaly detector may then be used to analyze a target text fragment. An anomaly score indicating that the target text is anomalous may indicate that the respective text may comprise fake news and/or may be machine-generated.

Data Protection and Privacy

Some cloud computing services allow users to upload files to a remote server for sharing with other users or for various manipulations (e.g., malware scanning). In one example, a software agent executing on a user's computer may automatically upload the contents of a selected folder, which may be indicated by the respective user. Uploading data to the cloud may comprise a privacy risk, especially when the user does not explicitly choose the content for uploading. For instance, if the user mistakenly drops some sensitive data (e.g., personal files or photos, medical records, etc.) to the upload folder, the respective data will be automatically uploaded against the user's wishes.

An embodiment of anomaly detector 20 may be installed on the user's computer and trained on files that are usually uploaded by the respective user, for instance on the 100 files most recently uploaded for remote scanning. An additional filter may select only a particular kind of files, such as portable document format (PDF) documents or Microsoft® Office® files. Such embodiments may use natural language processing techniques as described above, wherein tokens comprise individual words, etc. The trained anomaly detector may then be used to analyze each file currently earmarked for remote scanning in preparation for uploading. When the anomaly score determined for the respective file indicates a potential anomaly, some embodiments may prevent the respective file from being uploaded, and may notify the user.

Computer Security

Some embodiments of anomaly detector 20 may be trained on sequences of computing events occurring during a reference time interval considered to represent a normal pattern of activity, and then used to monitor the behavior of a set client computer systems. Anomalous behavior detected on a client may indicate a computer security threat, for instance that the respective client is executing malicious software or that an intruder/hacker has gained access to the respective client.

In some embodiments, anomaly detection comprises analyzing sequences of events occurring during execution of a monitored software entity (e.g., process, virtual machine, etc.) Examples of such events include the launch of a process/thread (e.g., a user launches an application, a parent process creates a child process, etc.), an attempt to access an input device of the respective client system (e.g., camera, microphone), an attempt to access a local or remote network resource (e.g., a hypertext transfer protocol—HTTP request to access a particular URL, an attempt to access a document repository over a local network), a request formulated in a particular uniform resource identifier scheme (e.g., a mailto: or a ftp: request), an execution of a particular processor instruction (e.g., system call), an attempt to load a library (e.g., a dynamic linked library—DLL), an attempt to create a new disk file, an attempt to read from or write to a particular location on disk (e.g., an attempt to overwrite an existing file, an attempt to open a specific folder or document), and an attempt to send an electronic message (e.g., email, short message service—SMS, etc.), among others. In some embodiments, periods of inactivity, i.e., time gaps between events and/or time intervals when the respective client system is idle, registers no user activity, or carries out only internal system tasks, may also qualify as events. A skilled artisan will understand that the systems and methods described herein may be adapted to analyzing other kinds of events, such as events related to a user's activity on social media, a user's browsing history, and a user's gaming activity, among others.

Event detection may comprise any method known in the art. In one example, a security agent executing on a protected client may register a set of monitored software entities with an event logging service of OS 40, such as event tracking for Windows®. In response, the agent may receive notifications of various events occurring during execution of the respective process, either in real time or in log form. Event logging tools typically generate a list of event descriptors including a timestamp for each event, a numerical code identifying an event type, an indicator of a type of process or application that generated the respective event, and other event parameters. Event sequences may be assembled by parsing the log.

Some embodiments may treat each event as a separate token. Tokens may be encoded according to an event vocabulary, which may comprise from several thousands to several million distinct event types. Training the anomaly detector may then comprise applying various transformations to the training event sequences as described above. Exemplary sequence transformations may include deleting, inserting, and permuting selected events of the training sequence, as well as replacing selected events with substitute events of a different kind.

Alternative embodiments may consider an event log entry as a sequence of text tokens. For instance, a log entry:
20:10|INFO|manager.storage|Found block rdd_2_3 locally
may be parsed into a token sequence:
20:10; INFO; manager; storage; Found; block; rdd_2_3; locally,
wherein individual tokens are separated by semicolons. Next, input modifier 40 may distort the respective token sequence by replacing selected tokens with substitutes. The position of tokens selected for substitution may be indicated by a mask, as described above. In one such example, a modified token sequence determined for the above example may read:
20:10; DEBUG; manager; thread; Found; block; rdd_2_3; globally,
wherein substitute tokens are indicated in bold. In some embodiments, masks are chosen so that selected fields of the blog entry are not modified. In turn, token generator 41 may be configured to select substitute tokens from a field-specific or position-specific pool of candidates. In the example above, a pool of candidate substitutes for the second token may consist of {WARNING, DEBUG, INFO, CRITICAL}.

An exemplary application of anomaly detection on logs comprises detecting zero-day exploits by analyzing access and/or event logs recorded on honeypot systems. An anomaly detector as described herein may be trained on a first part of a log, thus learning a 'normal' behavior of the respective honeypot during the time period corresponding to the first part of the log. The anomaly detector may then be used to analyze a second part of the log. An anomaly may indicate a change in the behavior of the honeypot between the first and the second parts of the log, suggesting a possible apparition of new malware, an activation of a botnet, etc. Some embodiments may periodically re-train the anomaly detector (for instance every hour on log data from the previous hour) and use it to monitor for new threats in real time.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented anomaly detection method comprising employing at least one hardware processor of a computer system to:
   in response to selecting a training token sequence from a training corpus of token sequences and in response to selecting a transformation from a pre-determined plurality of sequence transformations, distort the training token sequence by applying the selected transformation to the training token sequence to produce a distorted training token sequence;
   input the distorted training sequence to a sequence analyzer, the sequence analyzer comprising:
      a first prediction head configured to determine a first prediction indicator according to the distorted training token sequence, the first prediction indicator indicative of a likelihood that the selected transformation was applied to produce the distorted training token sequence, and
      a second prediction head configured to determine a second prediction indicator according to the distorted training token sequence, the second prediction indicator indicative of a likelihood that a selected token of the training token sequence was changed by the application of the selected transformation;
   in response to the sequence analyzer determining the first and second prediction indicators, adjust at least one parameter of the first prediction head according to the second prediction indicator and adjust at least one parameter of the second prediction head according to the first prediction indicator; and
   in response to adjusting parameters of the first and second prediction heads, employ the sequence analyzer to determine whether a target token sequence is anomalous.

2. The method of claim 1, wherein applying the selected transformation comprises replacing the selected token of the training token sequence with a substitute token.

3. The method of claim 2, further comprising:
   executing a token generator having a set of adjustable parameters and configured to generate the substitute token according to the training token sequence; and
   in response to the sequence analyzer determining the first and second prediction indicators, adjusting at least one parameter of the set of adjustable parameters according to the first or second prediction indicator.

4. The method of claim 2, further comprising adjusting the at least one parameter of the first prediction head or the at least one parameter of the second prediction head further according to a likelihood of appearance of the substitute token within the training token sequence in a context of the selected token.

5. The method of claim 1, wherein applying the selected transformation comprises an item selected from a group consisting of deleting the selected token of the training token sequence, inserting an additional token into the training token sequence, and permuting a selected subset of tokens of the training token sequence.

6. The method of claim 1, wherein:
   the training and target token sequences comprise text formulated in a natural language; and
   the method further comprises, in response to determining that the target token sequence is anomalous, determining that an author of the target token sequence differs from an author of the training token sequence.

7. The method of claim 1, wherein:
the training and target token sequences comprise text formulated in a natural language; and
the method further comprises, in response to determining that the target token sequence is anomalous, determining that a subject matter of the target token sequence differs from a subject matter of the training token sequence.

8. The method of claim 1, wherein:
the training and target token sequences comprise text formulated in a natural language; and
the method further comprises, in response to determining that the target token sequence is anomalous, determining that the target token sequence is machine-generated.

9. The method of claim 1, wherein:
the training and target token sequences consist of sequences of computing events; and
the method further comprises, in response to determining that the target token sequence is anomalous, determining that the target token sequence is indicative of a computer security threat.

10. The method of claim 1, comprising determining whether the target token sequence is anomalous according to a value of the second prediction indicator, the value of the second prediction indicator determined by the second prediction head according to the target token sequence.

11. A computer system comprising at least one hardware processor configured to execute an input modifier and a sequence analyzer, wherein:
the input modifier is configured to, in response to selecting a training token sequence from a training corpus of token sequences and in response to selecting a transformation from a pre-determined plurality of sequence transformations, distort the training token sequence by applying the selected transformation to the training token sequence to produce a distorted training token sequence;
the sequence analyzer comprises:
  a first prediction head configured to determine a first prediction indicator according to the distorted training token sequence, the first prediction indicator indicative of a likelihood that the selected transformation was applied to produce the distorted training token sequence, and
  a second prediction head configured to determine a second prediction indicator according to the distorted training token sequence, the second prediction indicator indicative of a likelihood that a selected token of the training token sequence was changed by the application of the selected transformation; and
wherein the at least one hardware processor is further configured to:
  input the distorted token sequence into the sequence analyzer,
  in response to the sequence analyzer determining the first and second prediction indicators, adjust at least one parameter of the first prediction head according to the second prediction indicator and adjust at least one parameter of the second prediction head according to the first prediction indicator, and
  in response to adjusting parameters of the first and second prediction heads, employ the sequence analyzer to determine whether a target token sequence is anomalous.

12. The computer system of claim 11, wherein applying the selected transformation comprises replacing the selected token of the training token sequence with a substitute token.

13. The computer system of claim 12, wherein:
the input modifier comprises a token generator having a set of adjustable parameters and configured to generate the substitute token according to the training token sequence; and
the at least one hardware processor is further configured to, in response to the sequence analyzer determining the first and second prediction indicators, adjust at least one parameter of the set of adjustable parameters according to the first or second prediction indicator.

14. The computer system of claim 12, wherein the at least one hardware processor is further configured to adjust the at least one parameter of the first prediction head or the at least one parameter of the second prediction head further according to a likelihood of appearance of the substitute token within the training token sequence in a context of the selected token.

15. The computer system of claim 11, wherein applying the selected transformation comprises an item selected from a group consisting of deleting the selected token of the training token sequence, inserting an additional token into the training token sequence, and permuting a selected subset of tokens of the training token sequence.

16. The computer system of claim 11, wherein:
the training and target token sequences comprise text formulated in a natural language; and
the at least one hardware processor is further configured to, in response to determining that the target token sequence is anomalous, determine that an author of the target token sequence differs from an author of the training token sequence.

17. The computer system of claim 11, wherein:
the training and target token sequences comprise text formulated in a natural language; and
the at least one hardware processor is further configured to, in response to determining that the target token sequence is anomalous, determine that a subject matter of the target token sequence differs from a subject matter of the training token sequence.

18. The computer system of claim 11, wherein:
the training and target token sequences comprise text formulated in a natural language; and
the at least one hardware processor is further configured to, in response to determining that the target token sequence is anomalous, determine that the target token sequence is machine-generated.

19. The computer system of claim 11, wherein:
the training and target token sequences consist of sequences of computing events; and;
the at least one hardware processor is further configured to, in response to determining that the target token sequence is anomalous, determine that the target token sequence is indicative of a computer security threat.

20. The computer system of claim 11, wherein the at least one hardware processor is configured to determine whether the target token sequence is anomalous according to a value of the second prediction indicator, the value of the second prediction indicator determined by the second prediction head according to the target token sequence.

21. A non-transitory computer-readable medium storing instructions which, when executed by at least one hardware processor of a computer system, cause the computer system to form an input modifier and a sequence analyzer, wherein:

the input modifier is configured to, in response to selecting a training token sequence from a training corpus of token sequences and in response to selecting a transformation from a pre-determined plurality of sequence transformations, distort the training token sequence by applying the selected transformation to the training token sequence to produce a distorted training token sequence;

the sequence analyzer comprises:
- a first prediction head configured to determine a first output according to the distorted training token sequence, the first output indicative of a likelihood that the selected transformation was applied to produce the distorted training token sequence, and
- a second prediction head configured to determine a second output according to the distorted training sequence, the second output indicative of a likelihood that a selected token of the training token sequence was changed by the application of the selected transformation; and wherein the instructions further cause the computer system to:
- input the distorted training sequence into the sequence analyzer,
- in response to the sequence analyzer determining the first and second outputs, adjust at least one parameter of the first prediction head according to the first output and adjust at least one parameter of the second prediction head according to the second output, and
- in response to adjusting parameters of the first and second prediction heads, employ the sequence analyzer to determine whether a target token sequence is anomalous.

* * * * *